United States Patent [19]

Kono et al.

[11] 4,214,832
[45] Jul. 29, 1980

[54] ELECTROSTATIC COPYING MACHINE COMPRISING IMPROVED DOCUMENT SCANNING MEANS

[75] Inventors: Masao Kono; Tatsuo Tani; Toshiyuki Ogawa; Kenzo Ariyama, all of Tokyo, Japan

[73] Assignee: Ricoh Company, Ltd., Tokyo, Japan

[21] Appl. No.: 864,548

[22] Filed: Dec. 27, 1977

[30] Foreign Application Priority Data

Dec. 25, 1976 [JP] Japan ................................ 51-157158
Dec. 25, 1976 [JP] Japan ................................ 51-157159

[51] Int. Cl.² ..................... G03G 15/28; G03B 27/52; G03B 27/50
[52] U.S. Cl. ........................................ 355/8; 355/30; 355/51
[58] Field of Search ....................... 355/51, 50, 8, 3 R, 355/11, 30, 47–49, 60, 66; 271/4, 233, 245, 246, 275

[56] References Cited

U.S. PATENT DOCUMENTS

| | | | |
|---|---|---|---|
| 3,524,704 | 8/1970 | Turner | 355/8 X |
| 3,532,338 | 10/1970 | Brinson et al. | 271/246 |
| 3,575,503 | 4/1971 | Van Auken et al. | 355/8 |
| 3,674,363 | 7/1972 | Baller et al. | 355/14 |
| 4,000,943 | 1/1977 | Bar-on | 355/8 |
| 4,008,956 | 2/1977 | Stemmle | 355/76 X |
| 4,018,523 | 4/1977 | Hughes | 355/8 |
| 4,023,791 | 5/1977 | Hori et al. | 271/246 X |
| 4,040,733 | 8/1977 | Satomi | 355/51 X |
| 4,043,550 | 8/1977 | Phillips et al. | 271/4 X |

FOREIGN PATENT DOCUMENTS 7515234 9/1976 Netherlands ................................ 355/50

Primary Examiner—L. T. Hix
Assistant Examiner—W. J. Brady
Attorney, Agent, or Firm—David G. Alexander

[57] ABSTRACT

A book type document is placed on a glass platen face down and scanned by a reciprocating optical system one or more times to produce one or more copies respectively. A retractable conveyor comprising an endless belt is moved onto the platen to automatically feed a sheet document inserted thereinto onto the platen for scanning. Where only one copy of a sheet document is required, the optical system is maintained stationary and the sheet document is fed by the conveyor over the platen at the proper speed, thus enabling rapid copying of a large number of sheet documents. The magnification is variable through adjustment of the positions of the elements of the optical system when held stationary and the speed of movement of the document by the conveyor. The conveyor feeds a sheet document onto the platen at high speed and the optical system is reciprocated to scan the document a plurality of times where a plurality of copies of the document are required.

27 Claims, 27 Drawing Figures

ELECTROSTATIC COPYING MACHINE COMPRISING IMPROVED DOCUMENT SCANNING MEANS

BACKGROUND OF THE INVENTION

The present invention relates to an electrostatic copying machine.

Electrostatic copying machines known in the art generally comprise a rotating photoconductive drum and a transparent platen for holding an original document for copying. An optical system focusses a light image of the document onto the drum to form an electrostatic image through localized photoconduction. The electrostatic image is developed by a toner substance to form a toner image which is transferred and fixed to a copy sheet to provide a permanent reproduction of the original document.

Usually, either the optical system or the platen is maintained stationary and the other is moved relative thereto for scanning the document. The scanning operation requires reciprocation of either the optical system or the platen. Even if the return speed of the movable scan member is made faster than the scan speed thereof, the return portion of the reciprocation constitutes wasted time. Such a configuration is inefficient for copying a large number of documents in the form of sheets.

Another drawback of such a system is that a presser plate is required to press a sheet document against the platen. The presser plate is heavy and must be raised and lowered in order to copy each document. Such an operation is tiring and unnecessarily time consuming, resulting in a copying speed which is far less than a maximum attainable copying speed. Another drawback is that the length of an original document which can be copied is limited to the length of the platen.

Although original documents come in various sizes, it is often desirable to copy the documents on copy paper of only one size, and furthermore have the entire copy sheet filled by the image. This requires that means be provided for varying the copying magnification. Although the light image size may be adjusted through variation of the position of a converging lens of the optical system and the length of the optical path of the image, it is also necessary to vary the scan speed. Where reduced size copies are to be made, the scan speed must be increased. A large drive motor is required to reciprocate a heavy platen or optical system at increased speed, and the movement is often unstable resulting in blurred copies. Increasing the weight of the platen or optical system to attain stable movement is counterproductive in that the size, cost and power requirements of the copying machine must be disproportionately increased.

SUMMARY OF THE INVENTION

The present invention overcomes the drawbacks of the prior art by providing an electrostatic copying machine which comprises a stationary glass platen and a movable optical system which is reciprocatable for copying bulky documents such as books and also for making multiple copies of book and sheet documents. A conveyor comprising an endless belt moves a sheet document onto the platen for multiple copies. Where only one copy of a sheet document is required, the optical system is maintained stationary and the document is moved relative thereto by the belt at the proper speed for scanning. The magnification may be changed by adjusting the positions of the optical system elements and the drive speed of the belt.

It is an object of the present invention to provide an electrostatic copying machine which does not require a presser plate for sheet documents.

It is another object of the present invention to provide a copying machine which can copy sheet documents at increased speed.

It is another object of the present invention to provide a copying machine which can copy sheet documents at variable magnification utilizing a lightweight, but stable and comparatively inexpensive mechanism.

It is another object of the present invention to provide a copying machine which can copy sheet documents of any length.

It is another object of the present invention to provide a generally improved electrostatic copying machine.

Other objects, together with the foregoing, are attained in the embodiments described in the following description and illustrated in the accompanying drawing.

DESCRIPTION OF THE PREFERRED EMBODIMENTS

Figure 1:
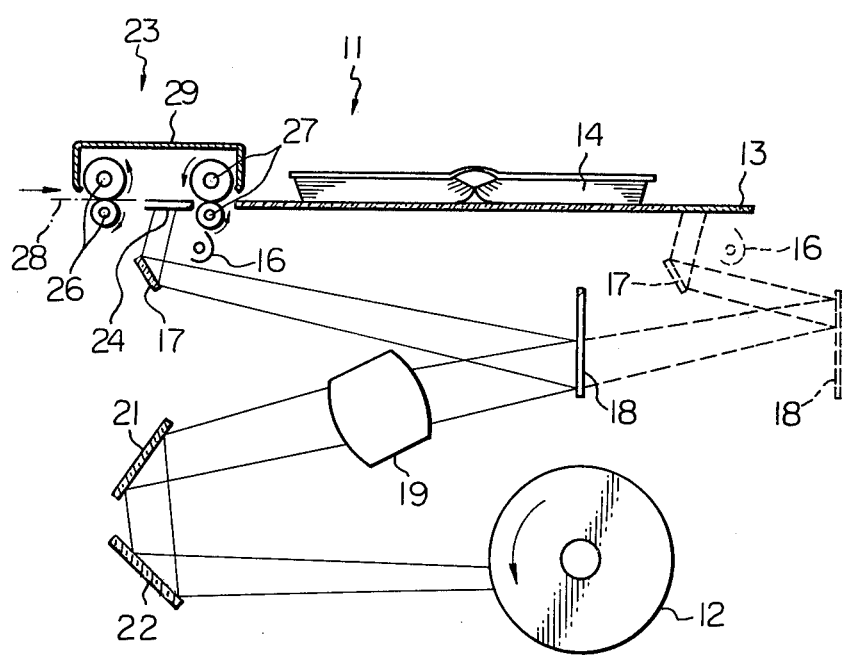
FIG. 1 is a schematic diagram of an optical scanning system of a prior art electrostatic copying machine.

While the electrostatic copying machine of the invention is susceptible of numerous physical embodiments, depending upon the environment and requirements of use, substantial numbers of the herein shown and described embodiments have been made, tested and used, and all have performed in an eminently satisfactory manner.

Referring now to the drawing, an improved prior art optical scanning apparatus for an electrostatic copying machine is generally designated by the reference numeral 11 and comprises a photoconductive drum 12 which is rotated counterclockwise at constant speed. A transparent glass platen 13 is fixedly provided above the drum 12 for supporting a bulky original document such as a book 14 which is to be copied. An optical scanning system comprises a lamp 16 which illuminates a linear portion of the book 14 through the platen 13. A plane mirror 17 reflects a light image of said linear portion to a plane mirror 18 which reflects said light image through a converging lens 19. From the lens 19, said light image is converged and reflected from plane mirrors 21 and 22 in sequence and focussed onto the surface of the photoconductive drum 12. For scanning the book 14, the lamp 16 and mirror 17 are moved leftwardly from the phantom line position to the solid line position at the same surface speed as the drum 12. The mirror 18 is also moved leftwardly from the phantom line position to the solid line position, but at ½ the surface speed of the drum 12. By this method, the book 14 is scanned and a light image of the entire book lower surface is progressively radiated onto the drum 12 causing localized photoconduction and the formation of an electrostatic image. The electrostatic image is subsequently developed, and the resulting toner image transferred to a copy sheet to provide a permanent reproduction of the book 14. After the leftward scan movement, the lamp 16 and mirrors 17 and 18 are returned to the phantom line position. Thus, one reciprocation of the movable elements of the optical system is required to make one copy.

As mentioned hereinabove, basic copying machines comprising an optical system of the type shown in FIG. 1 further comprise a presser plate to press an original document in the form of a sheet or printed page against the platen 13. In such a basic copying machine it is necessary to raise and lower the presser plate to copy each document. This makes the copying process slow and tiring.

The somewhat improved prior art copying machine of FIG. 1 overcomes this drawback by eliminating the presser plate and providing a sheet document feed mechanism which is generally designated as 23 and comprises another glass platen 24. A pair of inlet feed rollers 26 and a pair of outlet feed rollers 27 feed an original document in the form of a sheet 28 over the platen 24 in the rightward direction. Further illustrated is a cover 29 which prevents stray light from entering the interior of the mechanism 23.

For copying the sheet document 28, the lamp 16 and mirrors 17 and 18 are moved to the solid line position and maintained stationary. The sheet 28 is then inserted into the bite of the feed rollers 26 and fed rightwardly thereby over the platen 24 at the same surface speed as the drum 12. The lamp 16 illuminates the sheet 28 through the platen 24 and the mirror 17 reflects a light image of a linear portion of the sheet 28 on the platen 24 through the remainder of the optical system onto the drum 12 to form an electrostatic image of the sheet 28. In summary, the optical system is fixed in place below the platen 24 and the scanning movement is provided by feeding the sheet 28 through the mechanism 23. The sheet 28 is discharged onto the platen 13 by the outlet feed rollers 27 for removal.

The sheet feed mechanism 23 increases the speed of copying sheet documents since a new sheet may be inserted into the sheet feed mechanism 23 and copied as soon as the previous sheet is discharged, thereby eliminating the wasted time constituted by the return stroke of the optical system when the same is reciprocated for scanning.

Although the apparatus shown in FIG. 1 increases the copying speed where only one copy is to be made of a document in the form of a sheet or printed page, the operation becomes less than efficient where more than one copy is to be made of a sheet. Where such is required, it is necessary to repeatedly feed the sheet through the mechanism 23. The sheet must be picked up and inserted into the mechanism 23 for each copy. As another drawback of the apparatus of FIG. 1, no provision is made for varying the magnification of the copying process.

Figure 2:
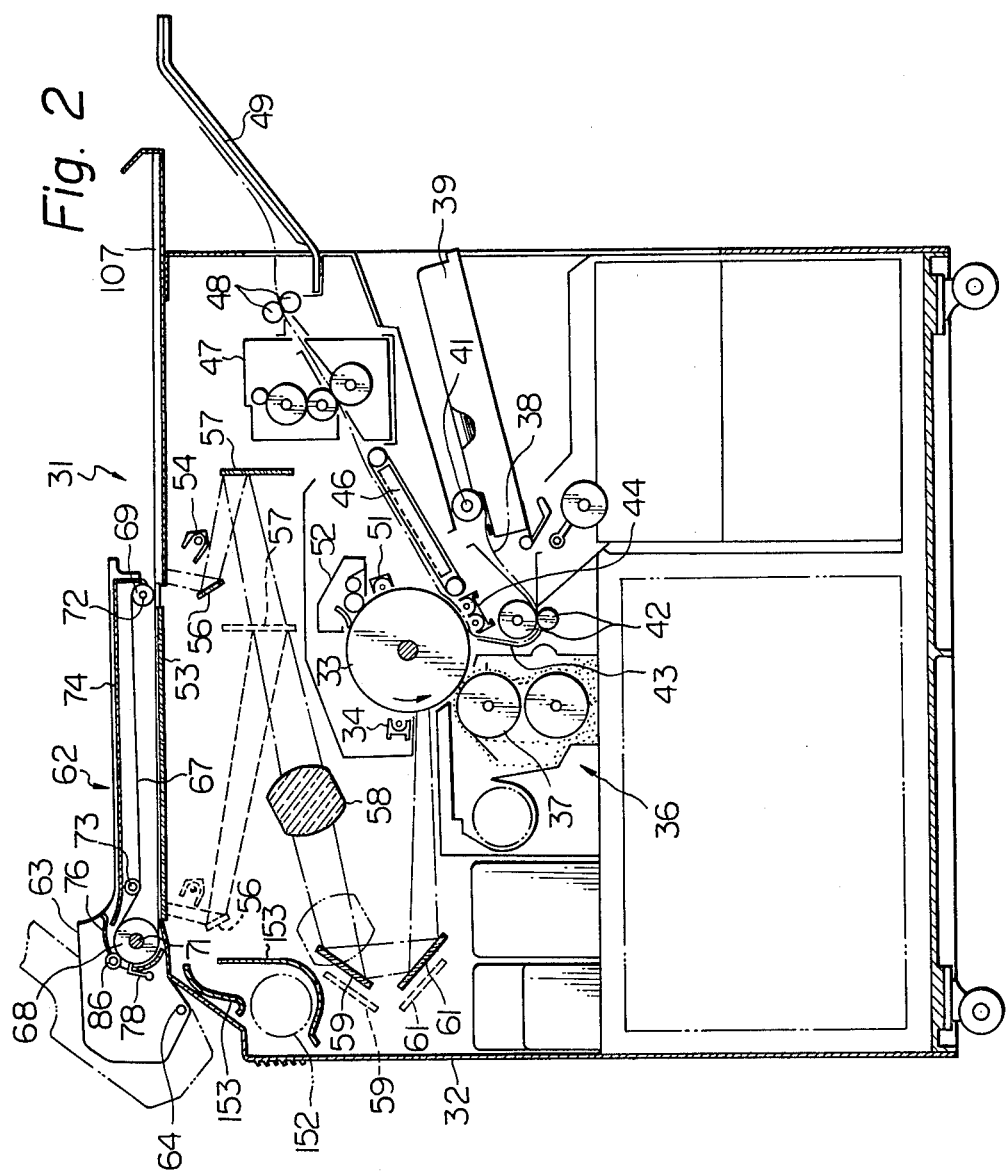
FIG. 2 is an overall schematic side elevation of an electrostatic copying machine embodying the present invention.

These drawbacks are overcome in an electrostatic copying machine of the present invention which is shown in FIG. 2 and designated as 31. The copying machine 31 comprises a housing 32 in which a photoconductive drum 33 is rotated counterclockwise at constant speed. A corona charging unit 34 applies a uniform electrostatic charge to the drum 33. Thereafter, an electrostatic image of an original document is formed on the drum 33 by an optical scanning system which will be described in detail hereinbelow through localized photoconduction. The electrostatic image is developed through application of a toner substance to the drum 33 by a developing unit 36 comprising a magnetic brush 37, thereby forming a toner image. A copy sheet 38 is fed from a stack of copy sheets in a cassette 39 by a primary feed roller 41 into the bite of secondary feed rollers 42. The feed rollers 42 in combination with a guide plate 43 feed the sheet 38 into contact with the drum 33 in register with the toner image. A transfer charger 44 applies an electrostatic charge to the sheet 38 which effects transfer of the toner image to the sheet 38. A conveyor 46 carries the sheet 38 with the toner image transferred thereto into a fixing unit 47 which fixes the toner image to the sheet 38 through a combination of heat and pressure. From the fixing unit 47 the sheet 38 is fed by a pair of feed rollers 48 into a discharge tray 49 from which the finished copy may be removed for use.

The detailed construction of the developing unit 36 and fixing unit 47 is not the subject matter of the present invention and will not be described in detail.

After transfer of the toner image, the drum 33 is discharged by a discharge unit 51 and any residual toner substance is removed therefrom by a cleaning unit 52.

In accordance with the present invention, a single transparent glass platen 53 is fixedly provided at the top of the housing 32. An optical system comprising a lamp 54, plane mirrors 56 and 57, converging lens 58 and plane mirrors 59 and 61 are provided to focus a light image of an original document on the platen 53 onto the drum 33 to form an electrostatic image. The optical system elements in FIG. 2 perform the same functions as the optical system elements in FIG. 1. The copying machine 31 further comprises a novel and unique conveyor which is generally designated as 62 and illustrated in detail in FIG. 3.

The conveyor 62 comprises a housing 63 which is pivotally mounted to the housing 32 about a shaft 64. The conveyor 62 is rotatable between a sheet feed position illustrated in FIG. 3 in engagement with the platen 53 and an inoperative position shown in FIG. 4 rotatably elevated away from the platen 53. For copying a bulky document such as a book 66 shown in FIG. 4, the conveyor 62 is moved to the inoperative position and the book 66 placed face down on the platen 53. The lamp 54 and mirror 56 are reciprocated from the solid line position of FIG. 3 to the phantom line position and back to the solid line position for scanning the book 66. The lamp 54 and mirror 56 are moved in the leftward or scan direction at the same surface speed as the drum 33, but may be returned to the solid line position at a higher speed. The mirror 57 is also reciprocated at ½ the surface speed of the drum 33 from the solid line position to the phantom line position shown in FIG. 2 and back. The operation of the copying machine 31 where the optical system is reciprocated for scanning will be herein referred to as a first scan mode.

Figure 9:
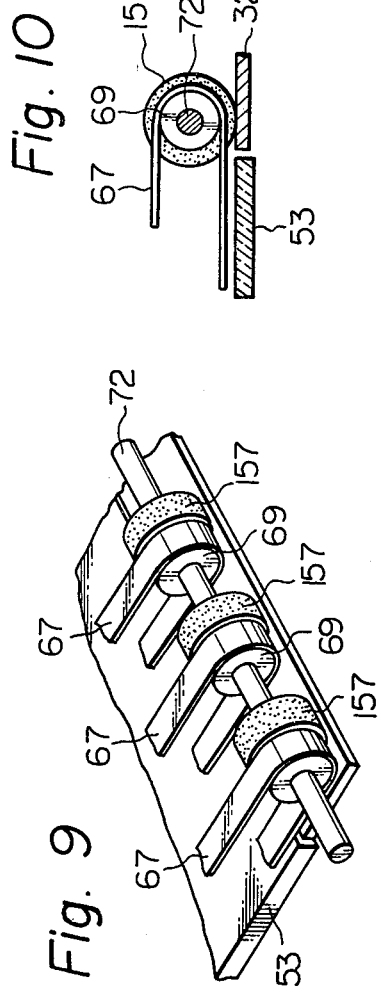
FIG. 9 is a perspective view of a modification of the conveyor.

Inside the housing 63 of the conveyor 62 are provided a plurality of endless belts 67 which are trained around drive rollers 68 and idler rollers 69 respectively. As best seen in FIG. 9, the rollers 68 and 69 are fixedly mounted on drive and driven shafts 71 and 72 which are rotatably supported by the housing 63. A tension roller 73 engages the belts 67 to take up any slack. The drive shaft 71 and thereby the rollers 68 and 69 and belts 67 are drivable in the counterclockwise direction for sheet document feed.

An upper guide plate 74 and a lower guide plate 76 are fixedly retained by the housing 63. A sheet document (not shown) inserted face up into an inlet 77 between the guide plates 74 and 76 is engaged by the belts 67 which convey the document around the rollers 68 onto the platen 53 face down.

A first stop member 78 is pivotal about a shaft 79 and urged counterclockwise or away from the belts 67 by a torsion spring which is not shown. A bellcrank lever 81 which is pivotal about a pin 82 is urged counterclockwise by a tension spring 83 which is connected between a fixed pin 84 and an arm 81a which constitutes an extension of the bellcrank lever 81. The spring 83 normally urges the bellcrank lever 81 counterclockwise so that the lower end thereof engages the stop member 78 and moves the same into engagement with the belts 67. A roller 86 which is rotatably supported at the upper end of the bellcrank lever 81 is held out of engagement with the belts 67 when the stop member 78 engages therewith. However, a solenoid 87 is connected to the arm 81a which, when energized, rotates the bellcrank lever 81 clockwise so that the roller 86 engages the belts 67 and the lower end of the lever 81 releases the stop member 78 to the extent that the stop member 78 disengages from the belts 67. Further illustrated is a sensor in the form of a microswitch 88 which senses for the presence or absence of a sheet document just upstream of the stop member 78, or in an insertion position.

Another bellcrank lever 91 is pivotal about a pin 92 inside the run of the belts 67 just above the left edge portion of the platen 53. A tension spring 93 urges the bellcrank lever counterclockwise so that a roller 94 which is rotatably supported at the lower end of the bellcrank lever 91 disengages from the belts 67. However, a solenoid 96 is provided which, when energized, rotates the bellcrank lever 91 clockwise against the force of the spring 93 and moves the roller 94 into pressing engagement with the belts 67, thereby pressing a sheet document disposed between the belts 67 and platen 53 against the platen 53.

An essentially similar arrangement comprising a bellcrank lever 95 rotatable about a pin 97, roller 98, spring 99 and solenoid 101 is provided near the right edge of the platen 53. Microswitches 102 and 103 are provided just upstream of the roller 94 and just downstream of the roller 98 respectively. Further included is a solenoid 104 which, when energized, elevates a second stop member 106 above the upper surface of the platen 53 into engagement with the belts 67 just upstream of the microswitch 103.

Figure 3:
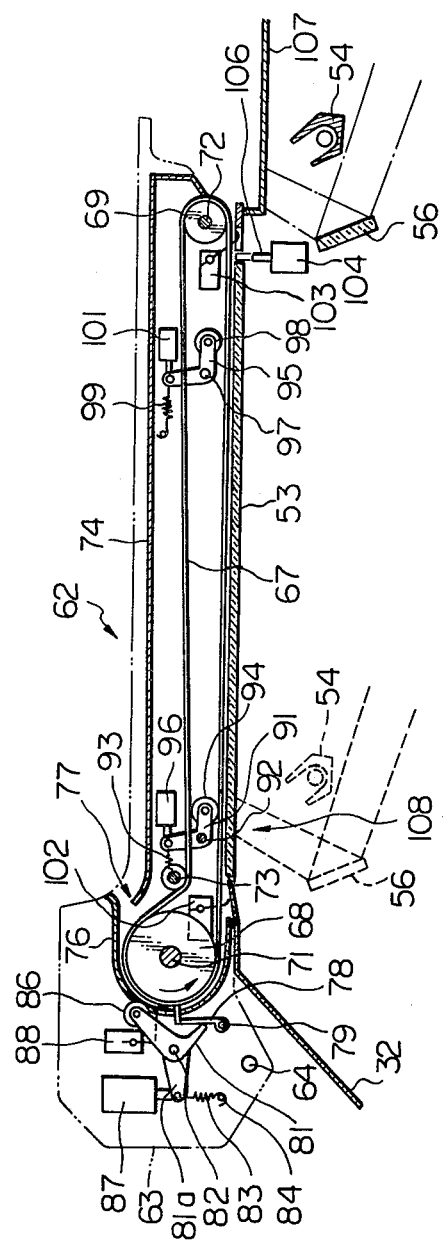
FIG. 3 is an enlarged view of an optical scanning system of the present copying machine.

For producing a plurality of copies of an original document in the form of a sheet, which will be herein referred to as a third scan mode, the conveyor 62 is moved into engagement with the platen 53 as in FIG. 3 and the solenoids 87, 96 and 101 are de-energized so that the rollers 86, 94 and 98 disengage from the belts 67. The first stop member 78 is moved into engagement with the belts 67 by the bellcrank lever 81 as described above. The desired number of copies is set into a copy counter (not shown), and a copy start button which is similarly not shown is depressed. An original document in the form of a sheet or printed page (not shown) is inserted into the inlet 77 face up and guided downwardly by the guide plate 76 until the leading edge of the sheet is abuttingly stopped by the stop member 78. Prior to this time, the belts 67 may be maintained stationary or alternatively may be driven when the start button is depressed.

Prior to abutment of the leading edge of the document with the stop member 78, the leading edge engages and closes the microswitch 88. This causes the belts 67 to be driven and the solenoid 87 to be energized. The stop member 78 is moved away from the belts 67, releasing the document and allowing the same to be fed by the belts 67 onto the platen 53. The roller 86 engages the sheet and presses the same against the belts 67, thereby increasing the driving effect. The solenoid 104 is energized, thereby elevating the stop member 106 into engagement with the belts 67.

The belts 67 are driven at a high feed speed to move the sheet document into a scan position in a minimum practical amount of time. The scan position is that in which the leading edge of the sheet document abuts against the stop member 106 and is held thereby in position on the platen 53. The driving force for the belts 67 is preferably terminated just before the document reaches the stop member 106. The belts 67 will continue to move, due to inertia of the drive system components, slightly after the document abuts against the stop member 106. Without the assistance of the rollers 94 and 98, the belts 67 engage the document with sufficient friction to move the same to the stop member 106, but slide over the document when the same is held. The stop member 106 is elongated in the direction perpendicular to the plane of the drawing, and the yieldable drive of the belts 67 compensates for any skew in the document feed through abutting alignment of the leading edge of the document with the stop member 106.

The drive of the belts 67 may be terminated at a predetermined time after the leading edge or the trailing edge of the sheet document clears the microswitch 88. Alternatively, the microswitch 102 may be used for timing the de-energization of the belts 67. Preferably, at a short time after the trailing edge of the sheet clears the microswich 88 which is sufficient for the trailing edge of the sheet to clear the stop member 78, the solenoid 87 is de-energized and the stop member 78 again engaged with the belts 67. If desired, the roller 94 may be engaged with the belts 67 during the high speed sheet feed to enhance the driving effect of the belts 67.

Figure 4:
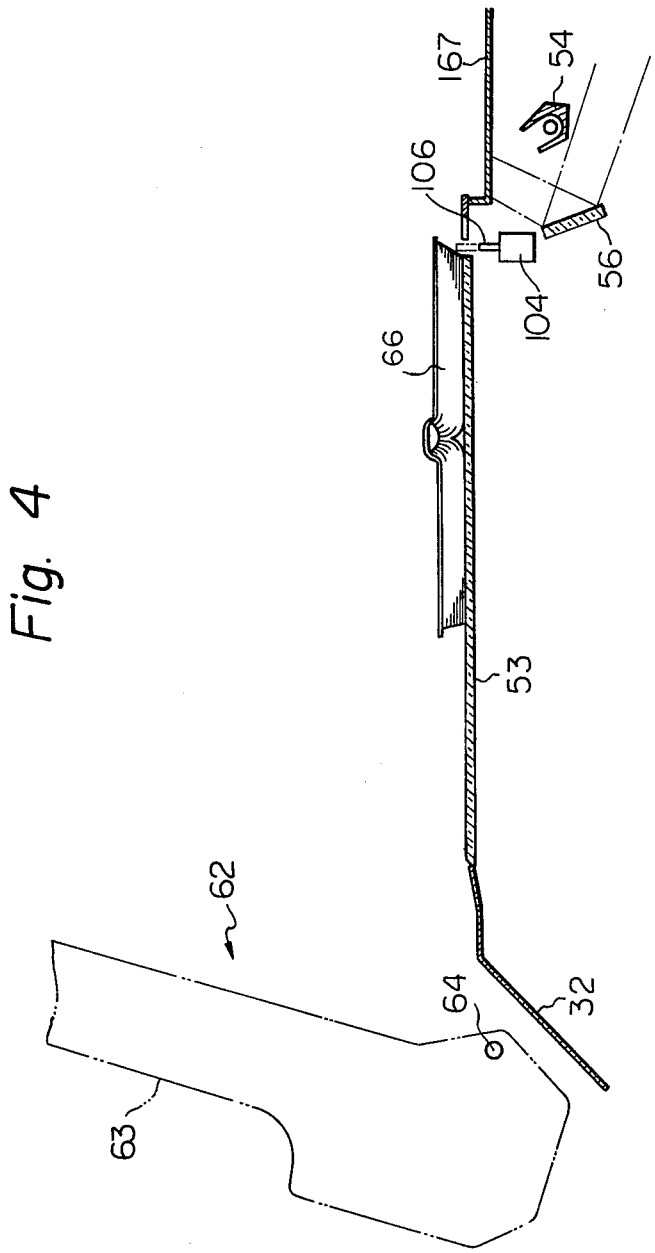
FIG. 4 is a fragmentary view showing a sheet document conveyor moved to an inoperative position.

After the sheet document is moved to the scan position in engagement with the stop member 106 and the belts 67 are stopped, the optical system is reciprocated to scan the document a plurality of times equal to the number of copies to be produced. With the sheet document in the scan position, the scanning and copying operation for a plurality of copies is the same as for making a plurality of copies of a bulky document such as a book as described above. Reference to FIG. 4 will show that the stop member 106 is used for copying book documents also as a reference member for the left edge of the book 66.

After the required number of copies have been made, the solenoid 104 is de-energized and the stop member 106 retracted below the surface of the platen 53. The belts 67 are driven at high speed and the solenoid 101 energized to move the roller 98 into pressing engagement with the belts 67 and document to enhance the feeding effect. The document is discharged from the right end of the conveyor 62 into a receiving tray 107 for removal. As the trailing edge of the document clears the microswitch 103, the copying machine 31 is made ready for copying another document. The microswitches 88, 102 and 103 are also used for jam detection, although such function will not be described in detail as it is not the subject matter of the present invention.

Since the stop member 78 is moved into engagement with the belts 67 just after the trailing edge of the document clears the same, another document may be inserted into the inlet 77 during the copying operation of the previous document to the insertion position in engagement with the stop member 78. The feed speed of the belts 67 is preferably made fast enough that the previous document may be discharged and the next document moved into the scan position during the return movement of the optical system for the last scanning reciprocation of the previous document.

For making a single copy of a sheet document at equal (1:1) magnification, the solenoids 87, 96 and 101 are energized to move the rollers 86, 94 and 98 into driving engagement with the belts 67, and the solenoid 104 is de-energized to retract the stop member 106. The stop member 78 is retracted by the bellcrank lever 81. The belts 67 are driven at a first scan speed which is equal to the surface speed of the drum 33. The lamp 54 and mirrors 56 and 57 are moved to their phantom line position below an exposure portion 108 of the platen 53 near the left edge thereof. The lens 58 and mirrors 59 and 61 are moved to their illustrated solid line position. All elements of the optical system are maintained stationary in the described position.

The document is moved over the platen 53 at the same surface speed as the drum 33 by the belts 67. The drive rollers 41 and 42 are triggered through engagement of the leading edge of the document with the microswitch 102 to feed the copy sheet 38 into engagement with the drum 33 in register with the toner image formed by scanning the document. It will be clearly understood that the scanning movement in this case is provided by moving the document through the exposure position 108 and that a light image of a linear portion of the document instantaneously above the exposure position 108 is focussed onto the drum 33. This is referred to herein as a second scan mode. The document after scanning is discharged by the belts 67 into the tray 107.

This copying operation is extremely fast since another document may be inserted into the inlet 77 immediately after a previous document and that there is no wasted time constituted by the return stroke of a reciprocating optical system. Sheet documents may be inserted one after another into the conveyor 62 for extremely high speed copying.

Making a single copy of a sheet document at a magnification other than unity is the same as copying at unity magnification as described above except as follows. The lens 58 and mirrors 59 and 61 are moved to and maintained stationary at phantom line positions as illustrated in FIG. 2. The belts 67 are driven at a second speed which corresponds to the non-unity magnification. Also, the timing of feeding the copy sheet 38 from the cassette 39 after tripping of the microswitch 102 is suitably altered.

Figure 20:
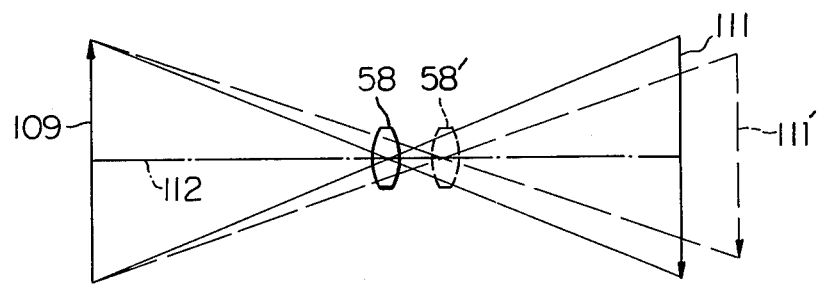
FIGS. 20 and 21 are graphs illustrating methods of copying magnification variation.
Figure 21:
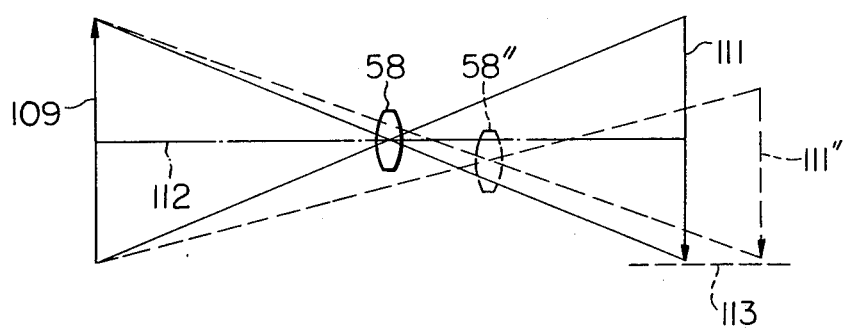

FIGS. 20 and 21 illustrate two different methods of altering the magnification by moving the lens 58. In FIG. 20, unity magnification is provided with the lens 58 in the solid line position. An inverted image 111 of an object 109 at unity magnification is produced. However, moving the lens 58 along an optical axis 112 thereof, or rightwardly, reduces the size of the image as indicated at 111' and increases the length of the optical path. FIG. 21 shows how the lens 58 may also be moved perpendicular to the axis 112 to a phantom line position 58" whereby the lower edges of the image 111 and an image 111" are aligned with a reference line 113. The method of FIG. 21 is especially advantageous in that it allows the use of an edge of the drum 33 and a corresponding edge of the copy sheet 38 as reference edges regardless of the degree of magnification.

In FIG. 2, shifting of the lens 58 leftwardly and upwardly parallel and perpendicular to its optical axis respectively from the solid line position to the phantom line position and moving the mirrors 59 and 61 leftwardly from the solid line to phantom line position to increase the length of the optical path achieves the effect of FIG. 21 in reducing the copying magnification and providing edge reference of the light image. The speed of the belts 67 is reduced to compress the light image in the longitudinal direction to a degree corresponding to compression of the light image in the transverse direction by shifting of the optical system elements.

Figure 5:
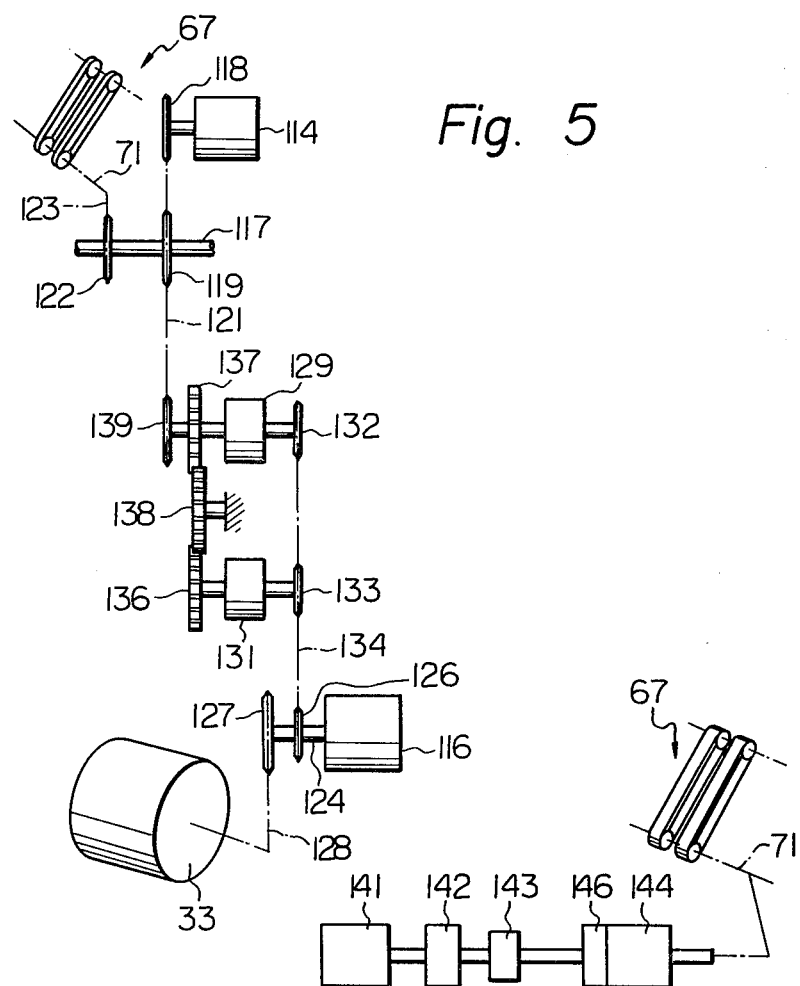
FIG. 5 is a schematic view of a drive means for the conveyor.

FIG. 5 illustrates one means of changing the drive speed of the belts 67 between the first, second and feed speeds. A high speed motor 114 is connected to a rotary shaft 117 through sprockets 118 and 119 and a chain 121. Another sprocket 122 fixed to the shaft 117 is connected to drive the drive shaft 71 for the belts 67 through a chain 123 and another sprocket which is not shown. The motor 114 is energized to drive the shaft 117 and belts 67 at the high feed speed where required.

A low speed motor 116 which is also used to constantly drive the drum 33 has an output shaft 124 on which are fixed sprockets 126 and 127. The sprocket 127 is connected to drive the drum 33 through a chain 128 and another sprocket which is not shown. The sprocket 126 is connected to clutch units 129 and 131 through a chain 134 and sprockets 132 and 133 respectively. A large gear 136 on an output shaft (no numeral) of the clutch unit 131 meshes with a small gear 137 on an output shaft (no numeral) of the clutch unit 129 through an idler gear 138. The chain 121 is trained around a sprocket 139 which is integral with the gear 137.

To drive the belts 67 at the first speed for unity magnification, the motor 114 is de-energized and the clutch unit 129 is engaged. The clutch unit 131 is disengaged. The chain 134 drives the sprocket 139 directly through the clutch unit 129.

For the second speed, which is higher than the first speed, for reduced magnification, the clutch unit 129 is disengaged and the clutch unit 131 is engaged. The sprocket 139 is driven from the chain 134 through the gears 136, 138 and 137 which provide a suitable gear ratio greater than unity and a direction of rotation which is the same as for direct drive.

Figure 6:
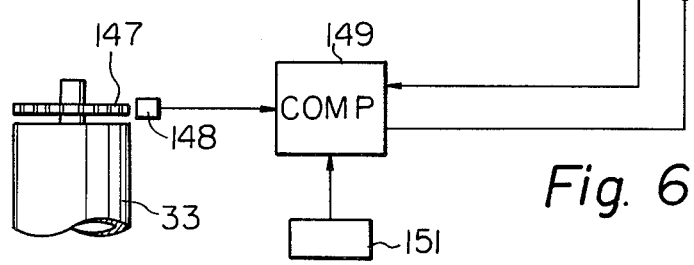
FIG. 6 is a schematic view of an alternative drive means for the conveyor.

FIG. 6 shows another means for changing the speed of the belts 67 comprising a variable speed servo system.

For high speed drive, a high speed motor 141 drives the shaft (no numeral) of a servo motor 144 through a clutch 142 and an overrunning clutch 143. The motor 144 is de-energized for high speed drive. For drive at the first and second speeds, the motor 141 is de-energized and the motor 144 is energized. The clutch 142 is disengaged.

A gear 147 rotatable with the drum 33 and a sensor 148 combine to photoelectrically, magnetically or ultrasonically sense the rotational speed of the drum 33 and feed the same to a comparator 149. The speed of the servo motor 144 and thereby the belts 67 is sensed by a tachometer 146 and fed to the comparator 149 which compares the speeds and feeds an error signal to the motor 144 to control the speed thereof. The desired speed (determined by the copying magnification) is input into the comparator 149 from a selection means 151. The comparator 149 comprises any known circuitry to compute the error signal based on a predetermined ratio of the servo motor 144 speed to the drum 33 speed corresponding to the desired magnification input from the means 151.

The arrangement of FIG. 21 is especially advantageous since it compensates for any speed fluctuation of the drum 33.

Figure 7:
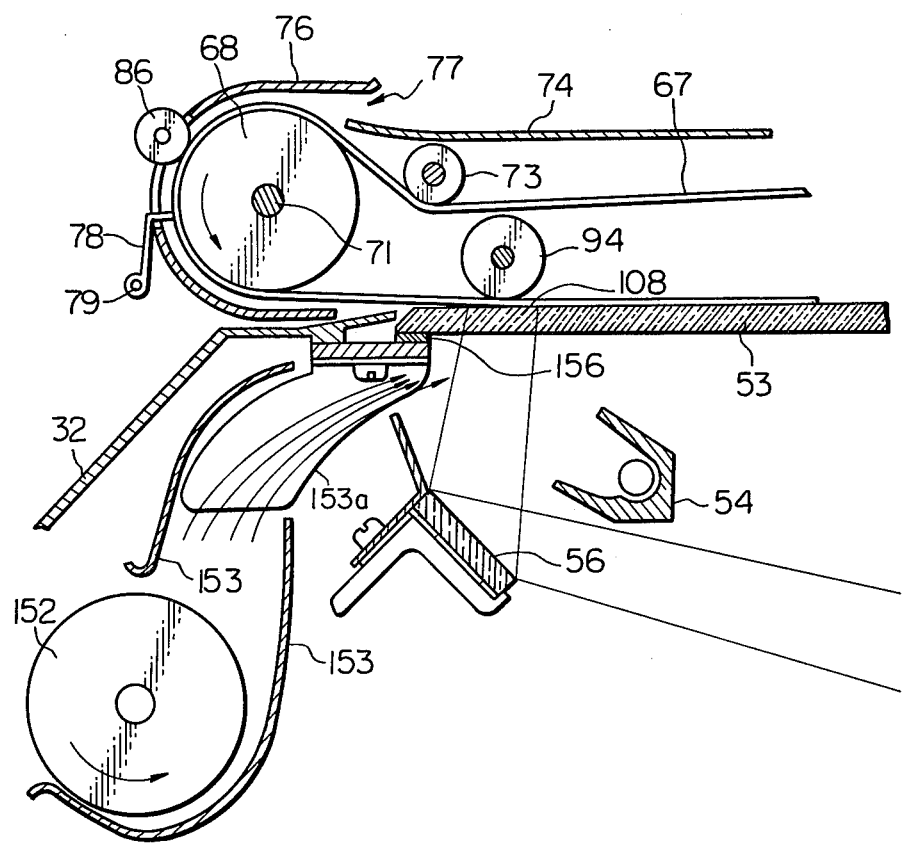
FIG. 7 is a fragmentary side elevation of a blower assembly of the copying machine.
Figure 8:
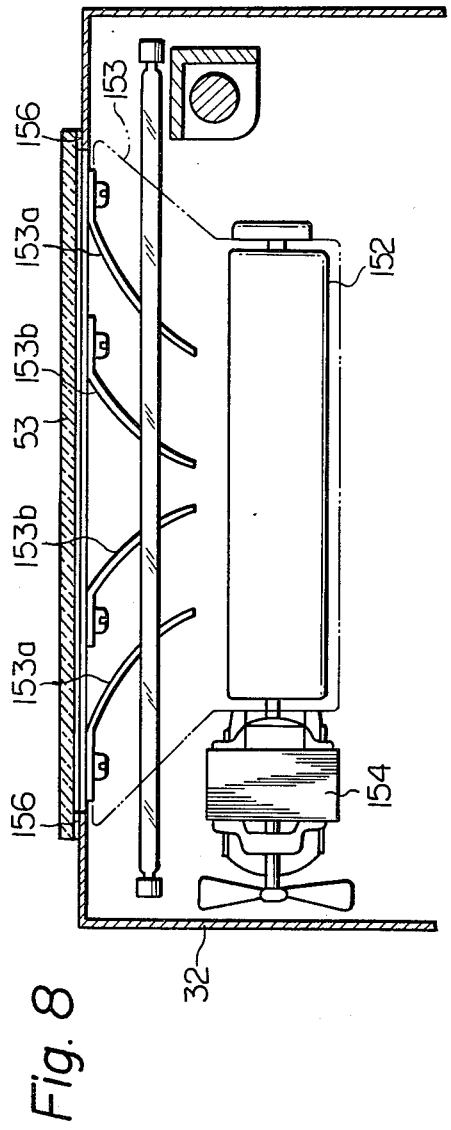
FIG. 8 is a rear elevation of the blower assembly.

As illustrated in FIGS. 2, 7 and 8, a blower 152 is provided to cool the exposure portion 108 of the platen 53 in the second copy mode in which the lamp 54 is held stationary, and a duct 153 guides the air flow from the blower 152 to the platen 53.

Figure 14:
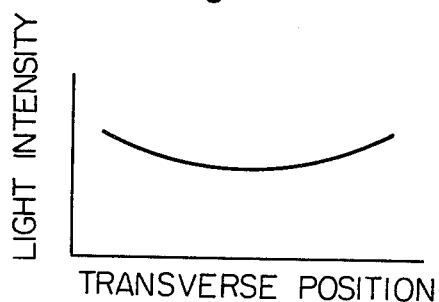
FIGS. 14, 15 and 16 are graphs illustrating the operation of a prior art blower assembly.
Figure 15:
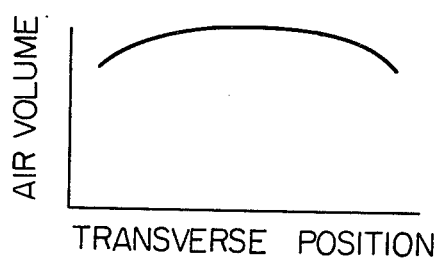
Figure 16:
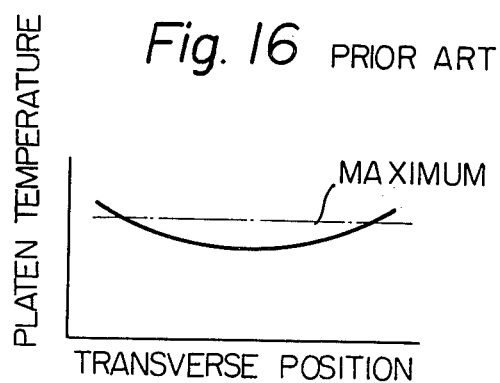

As illustrated in FIG. 14, it is common practice in the art to design the lamp 54 in such a manner as to illuminate the edges of the linear portion of the document above the exposure portion 108 with greater intensity than the central portion thereof. This is to compensate for the increased length of the optical path at the edges of the light image and the drop in image intensity in accordance with the inverse square law. However, in conventional copying machines the blower which is provided delivers more air to the center of the platen than to the edges as shown in FIG. 15. The resulting temperature in the transverse direction across the platen is therefore greater at the edges than in the center as shown in FIG. 16. At the extreme edges, the temperature may exceed a maximum allowable value as illustrated and introduce the danger of the platen cracking due to thermal stress, especially if the lamp 54 is of the halogen type. Increasing the power or length of the blower adds disproportionately to the size and cost of the copying machine.

As best seen in FIG. 7, the present invention overcomes this problem by mounting the blower 152 and duct 153 to the housing 32 and providing a rubber shock absorbing pad 156 between the duct 153 and platen 53. Further illustrated is a motor 154 for driving the blower 152. The duct 153 comprises two outer sections 153a and two inner sections 153b which serve to divert most of the air from the blower 152 to the edges of the exposure portion 108 of the platen 53. This increases the cooling effect at the edges and provides a substantially even temperature, well below the maximum limit, across the platen 53.

Figure 10:
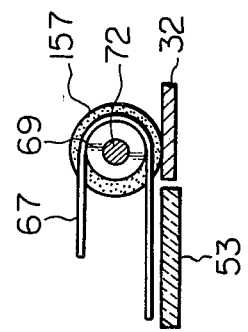
FIG. 10 is a fragmentary side elevation of the modification of FIG. 9.

FIGS. 9 and 10 illustrate friction rollers 157 which are mounted on the shaft 72 and have a diameter greater than the diameter of the belts 67 trained around the rollers 69. The rollers 157 are made of rubber or the like and aid in feeding the sheet documents out of the conveyor 62.

Figure 11:
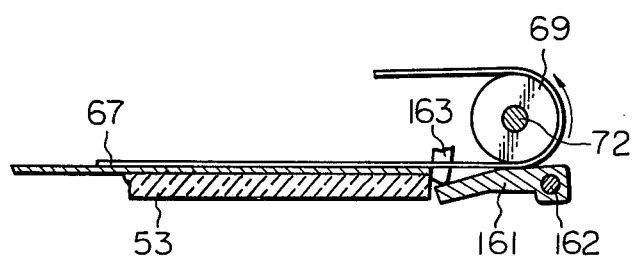
FIG. 11 is a fragmentary side elevation showing another modification of the conveyor.
Figure 12:
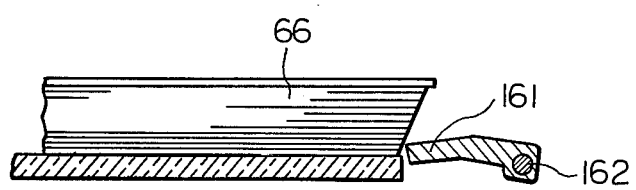
FIG. 12 is a view of the modification of FIG. 11 showing a book document in position for copying.

FIGS. 11 and 12 illustrate another arrangement of a stop member 161 which is rotatably supported about a shaft 162 provided to the housing 32 and is urged toward an upper position as illustrated in FIG. 12 by a torsion spring which is not shown. In the position of FIG. 12, the left edge of the stop member 161 serves as a reference member for the book 66, with the conveyor 62 moved away from the platen 53.

For copying sheet documents with the conveyor 62 engaged with the platen 53, a release member 163 provided to the conveyor 62 transversely external of the platen 53 presses the stop member 161 below the platen 53 to an inoperative position as shown in FIG. 11. This arrangement is useful where another stop member is provided to the conveyor 62 for sheet documents as will be described below.

Figure 13:
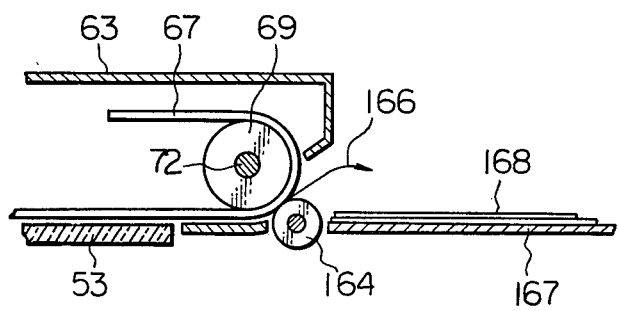
FIG. 13 illustrates another modification of the conveyor.

FIG. 13 illustrates the provision of a roller 164 which engages with the belts 67 in such a manner as to feed the sheet documents obliquely upwardly away from the conveyor 62 therebetween as indicated by an arrow 166. This arrangement is especially advantageous where a receiving tray 167 is substantially flush with the platen 53 since sheets can be lifted over and onto sheets 168 already discharged into the tray 167.

Figure 17:
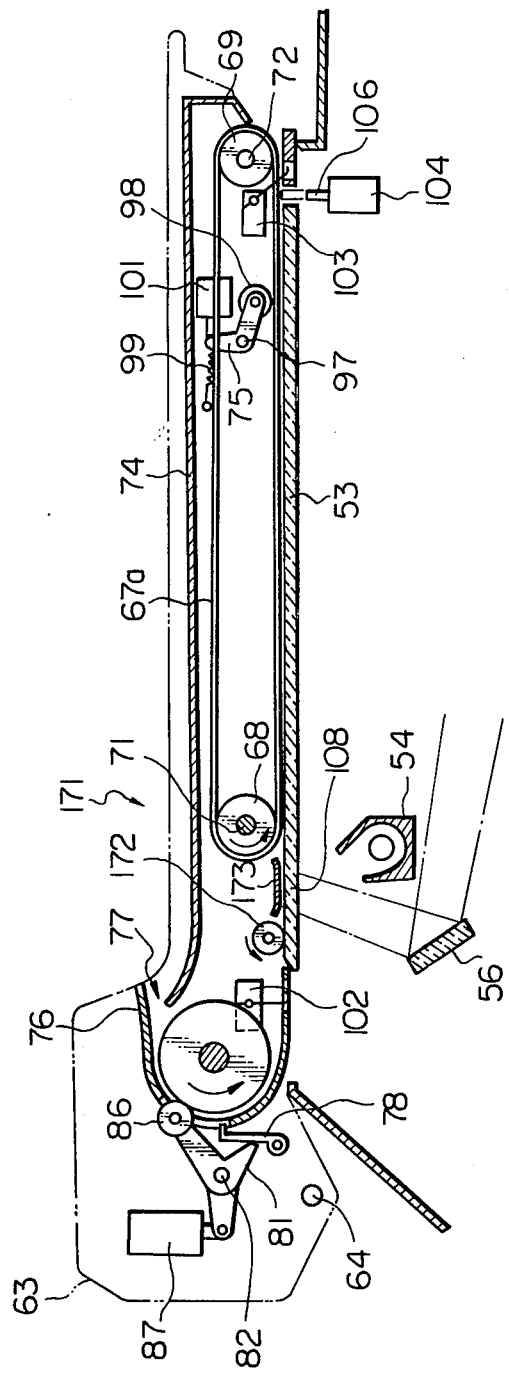
FIGS. 17, 18 and 19 are elevational views illustrating various further modifications of the conveyor.

FIG. 17 illustrates a modification of the conveyor 62 which is designated as 171. Like elements are designated by the same reference numerals. The conveyor 171 differs from the conveyor 62 in that belts are provided only downstream of the exposure portion 108 as indicated at 67a. A roller 172 is provided upstream of the exposure portion 108. Between the roller 172 and belts 67a is provided a white guide plate 173 under which the sheet documents are fed. This modification prevents shadows of the belts 67a from appearing in the copies.

Figure 18:
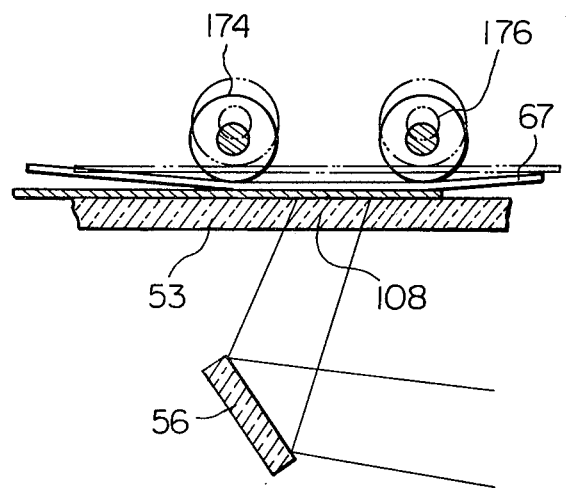

FIG. 18 illustrates another modification in which two rollers 174 and 176 spaced on opposite sides of the exposure portion 108 are provided rather than a single roller 94 to firmly press the belts 67 and document against the platen 53.

Figure 19:
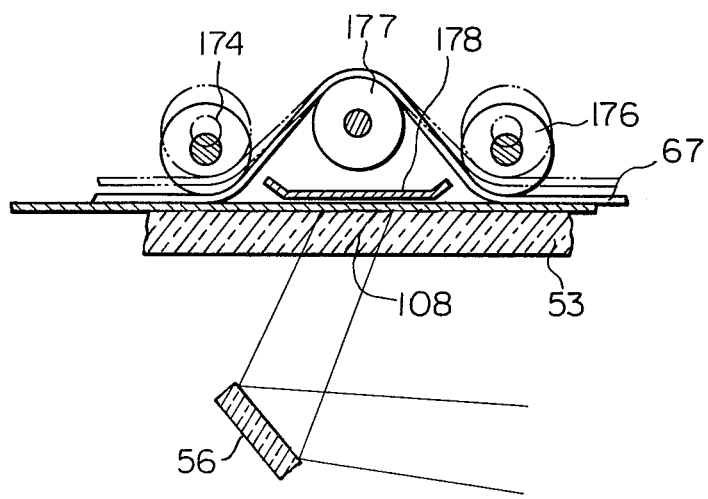

FIG. 19 illustrates an improvement to the modification of FIG. 18 in that another roller 177 is provided to hold the belts 67 above the exposure portion 108 and prevent shadows of the belts 67 from appearing in the copies. A white guide plate 178 under which the documents are fed is provided between the rollers 174 and 176 and between the roller 177 and the platen 53.

FIGS. 22 to 25 and 27 illustrate another version of the conveyor 62, here designated as 181, in which a stop member or lever 182 is provided to the conveyor 181 rather than to the housing 32. The stop member 161 of FIG. 11 may be provided for book documents, if desired.

Figure 22:
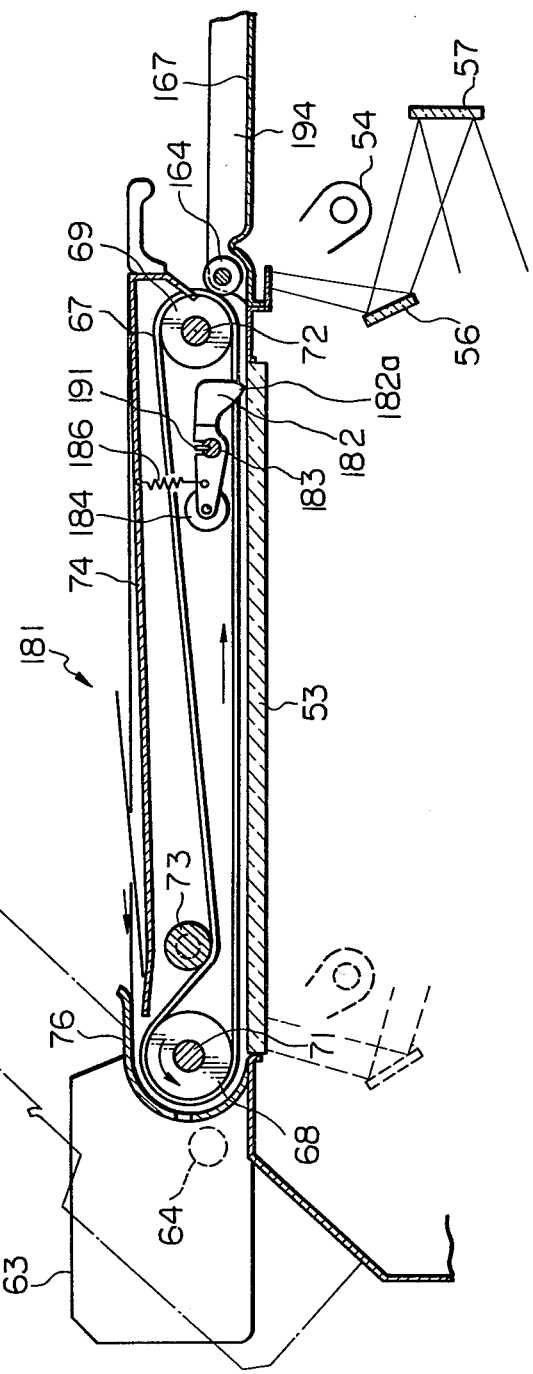
FIG. 22 is a side elevation illustrating yet another modification of the conveyor.
Figure 23:
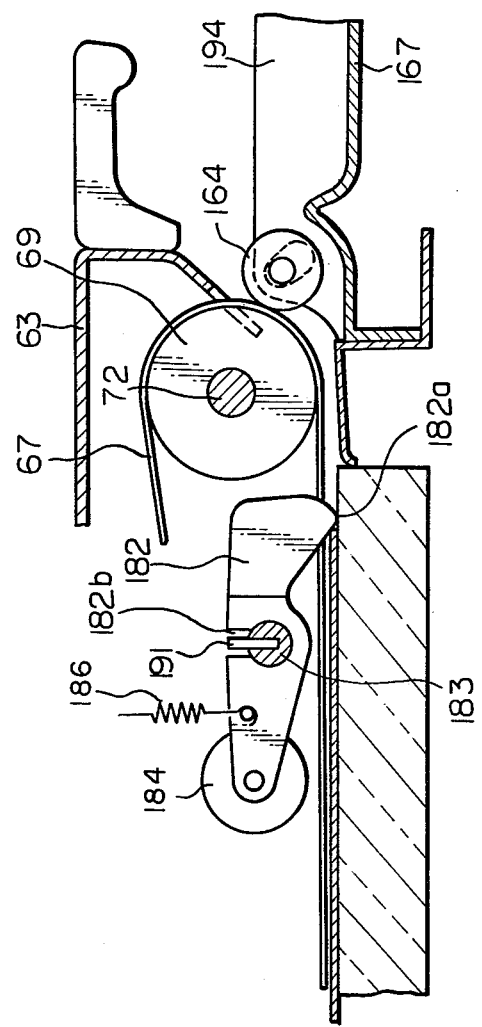
FIG. 23 illustrates the modification of FIG. 22 in greater detail, showing a stopper member in an engaged position.

The stop lever 182 is rotatably supported about a shaft 183. A roller 184 is rotatably supported at the left end of the lever 182 as illustrated in FIGS. 22 and 23. Although only one stop lever 182 is illustrated, actually a plurality of such stop levers 182 are provided on the shaft 183.

The stop lever 182 is urged clockwise by a tension spring 186 so that a lower right end 182a protrudes between the belts 67 and engages with the platen 53. Preferably, the stop lever 182 is made of a rubber or similar material to minimize impact forces on the platen 53 which might break the same. In the normal position illustrated in FIG. 23 the end 182a serves to hold a sheet document in the scan position and the roller 184 is disengaged from the belts 67.

Figure 24:
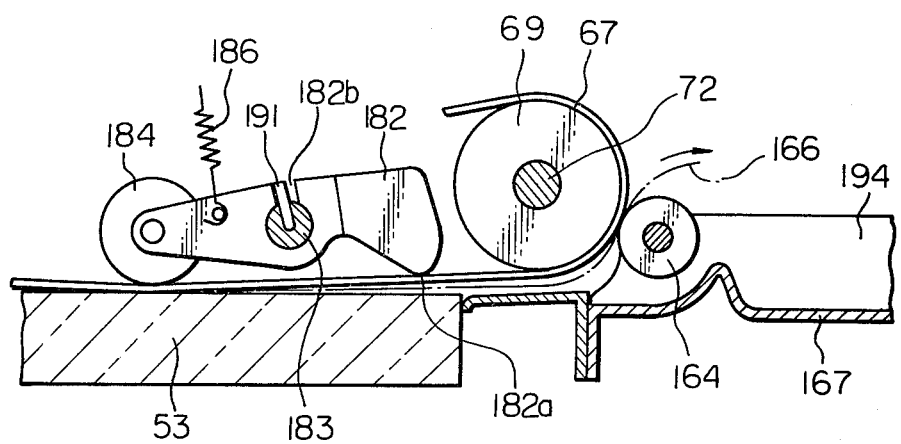
FIG. 24 is similar to FIG. 23 but shows the stopper member in a disengaged position.
Figure 25:
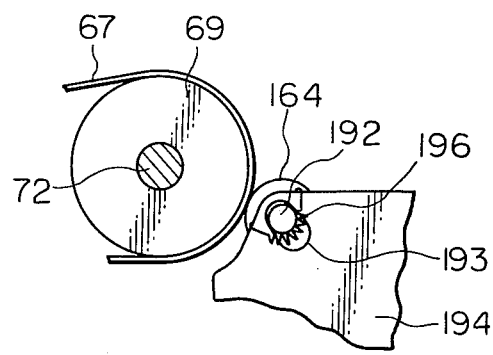
FIG. 25 shows a detail of the modification of FIG. 22.
Figure 27:
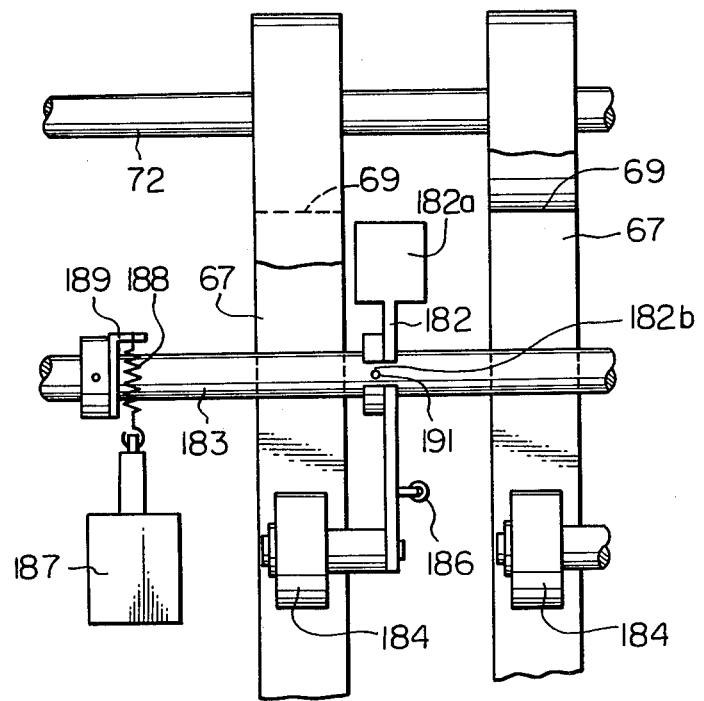
FIG. 27 is an overhead view of the modification of FIG. 22.

As best seen in FIG. 27, a solenoid 187 is connected to the shaft 183 through a tension spring 188 and arm 189. The upper portion of the lever 182 above the shaft 183 is cut away as indicated at 182b and a pin 191 extends through the cutout 182b from the shaft 183. As illustrated in FIG. 24, to retract the end 182a from the platen 53 and engage the roller 184 with the belts 67, the solenoid 187 is energized, rotating the shaft 183 counterclockwise. The pin 191 engages the left wall of the cutout 182b and rotates the lever 182 counterclockwise therewith. This accomplishes the intended function and allows the document to be fed out of the conveyor 181 by the belts 67 with the assistance of the roller 184. Further illustrated is the roller 164 of FIG. 13 which, as shown in FIG. 25, is mounted on a shaft 192 which is slidably retained in slots 193 in opposite end members 194, only one of which is visible in the drawing. A coil spring 196 urges the shaft 192 and roller 164 into engagement with the belts 67.

Figure 26:
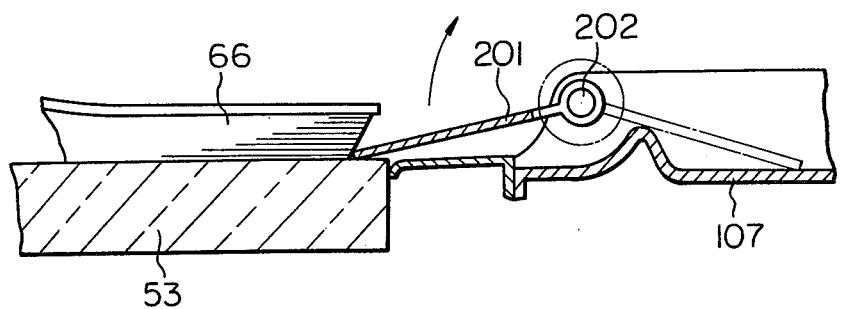
FIG. 26 shows an addition to the modification of FIG. 22.

Illustrated in FIG. 26 is a stop member 201 which is rotatably mounted about a shaft 202 to serve as a reference member for book documents when the conveyor 62 is raised to the inoperative position. With the stop member 201 in the counterclockwise position as illustrated in solid line, the edge thereof serves as a guide for the edge of a book placed on the platen 53. The stop member 201 may be pivoted to the clockwise or phantom line position for copying sheet documents. Means may be provided, although not illustrated, for preventing the conveyor 62 from being moved onto the platen 53 until the stop member 201 is moved out of the way.

In summary, it will be seen that the present invention provides an electrostatic copying machine comprising a novel and unique optical scanning system which can quickly and advantageously make single and multiple copies of sheet and bulky documents. For making one or more copies of a book in a first scan mode, various members of an optical system are reciprocated once for each copy. For one copy of a sheet document, the optical system is maintained stationary and the document fed relative thereto in a second scan mode. For a plurality of copies of a sheet document, the document is moved into a scan position at a high feed speed and various members of the optical system are reciprocated once for each copy in a third scan mode. Variable magnification copying is possible in the second scan mode using a very simple but efficient mechanism. It will be further noted that, in the second scan mode, documents of any length may be copied if sufficiently long copy sheets are provided.

Various modifications, such as replacing the belts 67 with a single wide belt, will become possible for those skilled in the art after receiving the teachings of the present disclosure without departing from the scope thereof.

What is claimed is:

1. An electrostatic copying machine comprising:
   a transparent platen for supporting an original document;
   a moving photoconductive member;
   optical means having a movable scan member for focussing a light image of the original document onto the photoconductive member to form an electrostatic image;
   conveyor means movable over the platen surface for conveying the original document across the platen;
   control means for selectively controlling the optical means and conveyor means in a first scan mode in which the document is maintained stationary in a scan position on the platen and the movable scan member is moved relative thereto, a second scan mode in which the movable scan member is held stationary and the document is moved by the conveyor means at a scan speed, and a third scan mode in which the document is moved by the conveyor means from an insertion position to the scan position at a feed speed which is higher than the scan speed and the movable scan member is moved relative thereto;
   the movable scan member being held stationary in the second scan mode in a position such as to focus a light image of a linear portion of the document on an exposure portion of the platen onto the photoconductive member, the conveyor means comprising an endless belt, first and second rollers spaced on opposite sides of the exposure portion respectively for pressing the belt and document against the platen and a third roller spaced between the first and second rollers over the exposure portion, the third roller holding the belt away from the exposure portion, the conveyor means further comprising a white guide means disposed between the third roller and the exposure portion, the document being moved between the guide means and the platen.

2. A copying machine as in claim 1, in which the movable scan member in the second scan mode is held stationary in a position below the insertion position near one edge of the platen.

3. A copying machine as in claim 1, in which the optical means comprises an optical member which is movable between a first position for a first copying magnification and a second position for a second copying magnification, the control means controlling the conveyor means to move the document in the second scan mode at a first scan speed for the first copying magnification and at a second scan speed for the second copying magnification.

4. A copying machine as in claim 3, in which the conveyor means is operative to move the document from the insertion position to the scan position in the third scan mode at the feed speed which is higher than the first and second scan speeds.

5. A copying machine as in claim 1, in which the conveyor means is movable to an inoperative position away from the platen in the first scan mode.

6. A copying machine as in claim 1, in which the conveyor means comprises a first motor for driving the belt at the feed speed and a second motor for driving the belt at the first and second scan speeds.

7. A copying machine as in claim 6, in which the conveyor means comprises clutch means for selectively connecting the first and second motors to drive the belt.

8. A copying machine as in claim 1, in which the conveyor means comprises a motor and a variable speed servo speed control means connecting the motor to drive the belt.

9. A copying machine as in claim 1, further comprising a retractable first stop member for holding the document in the insertion position.

10. A copying machine as in claim 9 further comprising a lever and a roller rotatably supported by the lever, the lever being movable between a first position in which the roller disengages from the belt and the lever engages with and causes the first stop member to move into engagement with the belt to hold the document in the insertion position; and a second position in which the roller drivingly engages the document and belt and the lever disengages from the first stop member causing the first stop member to retract and allow the belt to move the document to the scan position.

11. A copying machine as in claim 1, further comprising a presser member movable into pressing engagement with the conveyor means and document to facilitate movement of the document by the conveyor means.

12. A copying machine as in claim 11, in which the presser member comprises a roller which presses the conveyor means and document against the platen.

13. A copying machine as in claim 1, further comprising a second retractable stop member for holding the document in the scan position.

14. A copying machine as in claim 13, in which the second stop member is supported by the conveyor means.

15. A copying machine as in claim 14, in which the conveyor means comprises a plurality of endless belts, the second stop member comprising a lever and a roller rotatably supported by the lever, the lever being movable between a first position in which the roller disengages from the belts and the lever protrudes between the belts to engage the platen and hold the document in the scan position; and
   a second position in which the roller drivingly engages the belts and document and the lever disengages from the platen allowing the belts to move the document away from the scan position.

16. A copying machine as in claim 13, in which the second stop member is supported adjacent to the platen, the conveyor means comprising a release member for moving the second stop member to an inoperative position when the conveyor means engages the platen.

17. A copying machine as in claim 13 in which the second stop member is rotatably movable onto and off of the platen.

18. A copying machine as in claim 1, further comprising a roller engaging with the belt to feed the document therebetween away from the scan position.

19. A copying machine as in claim 18, in which the belt and roller are arranged to feed the document in an obliquely upward direction therebetween.

20. A copying machine as in claim 1, further comprising sensor means for sensing a leading edge and a trailing edge of the document at the exposure portion.

21. A copying machine as in claim 3, in which the optical member comprises a lens which is movable parallel and perpendicular to an axis thereof between said first and second positions.

22. A copying machine as in claim 2, further comprising sensor means for sensing a leading edge and a trailing edge of the document at the insertion position.

23. A copying machine as in claim 2, further comprising sensor means for sensing a leading edge and a trailing edge of the document at the scan position.

24. A copying machine as in claim 1, further comprising a retractable stop member for holding the document in the scan position, the stop member being supported adjacent to the platen, the conveyor means comprising a release member for moving the stop member to an inoperative position when the conveyor means engages the platen, the stop member being normally biased to protrude above the platen, the release member engaging the stop member transversely external of the platen for resiliently pressing the stop member below the platen when the conveyor means engages the platen.

25. A copying machine as in claim 1, further comprising a retractable stop member for holding the document in the scan position, the stop member being pivotally supported in such a manner as to be pivotal between an inoperative position below the platen and an operative position in which an edge of the stop member holds the document in the scan position.

26. An electrostatic copying machine comprising:
   a transparent platen for supporting an original document;
   a moving photoconductive member;
   optical means having a movable scan member for focussing a light image of the original document onto the photoconductive member to form an electrostatic image;
   conveyor means movable over the platen surface for conveying the original document across the platen; and
   control means for selectively controlling the optical means and conveyor means in a first scan mode in which the document is maintained stationary in a scan position on the platen and the movable scan member is moved relative thereto, a second scan mode in which the movable scan member is held stationary and the document is moved by the conveyor means at a scan speed, and a third scan mode in which the document is moved by the conveyor means from an insertion position to the scan position at a feed speed which is higher than the scan speed and the movable scan member is moved relative thereto;
   the movable scan member being held stationary in the second scan mode in a position such as to focus a light image of a linear portion of the document on an exposure portion of the platen onto the photoconductive member, the optical means further comprising a lamp to illuminate the linear portion of the document in such a manner that edges of the linear portion are illuminated with greater intensity than a central portion thereof, the copying machine further comprising blower means adapted to blow cooling air against the exposure portion of the platen in such a manner that more air is blown against edges of the exposure portion than a central portion thereof.

27. A copying machine as in claim 26, in which the blower means comprises a blower and a duct shaped to direct a major portion of air from the blower to the edges of the exposure portion of the platen.

* * * * *